(12) United States Patent
Rice et al.

(10) Patent No.: US 10,996,602 B2
(45) Date of Patent: May 4, 2021

(54) HEIGHT CONTROL IN SELECTIVE DEPOSITION BASED ADDITIVE MANUFACTURING OF PARTS

(71) Applicant: Evolve Additive Solutions, Inc., Minnetonka, MN (US)

(72) Inventors: Andrew Rice, Chaska, MN (US); Zeiter Farah, Minneapolis, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 2 days.

(21) Appl. No.: 16/232,585

(22) Filed: Dec. 26, 2018

(65) Prior Publication Data

US 2019/0204769 A1    Jul. 4, 2019

Related U.S. Application Data

(60) Provisional application No. 62/612,083, filed on Dec. 29, 2017.

(51) Int. Cl.

| | | |
|---|---|---|
| G03G 15/22 | (2006.01) | |
| B29C 64/393 | (2017.01) | |
| B29C 64/147 | (2017.01) | |
| G03G 15/00 | (2006.01) | |
| B33Y 10/00 | (2015.01) | |
| B33Y 50/02 | (2015.01) | |

(52) U.S. Cl.
CPC ......... *G03G 15/224* (2013.01); *B29C 64/147* (2017.08); *B29C 64/393* (2017.08); *B33Y 10/00* (2014.12); *B33Y 50/02* (2014.12); *G03G 15/50* (2013.01)

(58) Field of Classification Search
CPC ... B29C 64/147; B29C 34/153; B29C 64/386; B29C 64/393; B29C 64/40; B33Y 10/00; B33Y 50/00; B33Y 50/02; G03G 15/224; G03G 15/50
See application file for complete search history.

(56) References Cited

U.S. PATENT DOCUMENTS

| | | |
|---|---|---|
| 8,123,999 B2 | 2/2012 | Priedeman, Jr. et al. |
| 8,246,888 B2 | 8/2012 | Hopkins et al. |
| 8,459,280 B2 | 6/2013 | Swanson et al. |
| 8,488,994 B2 | 7/2013 | Hanson et al. |

(Continued)

*Primary Examiner* — George R Koch
(74) *Attorney, Agent, or Firm* — Pauly, DeVries Smith & Deffner LLC

(57) ABSTRACT

A method of operating a selective deposition based additive manufacturing system capable of producing a three-dimensional (3D) part includes developing a first layer using at least one electrostatography engine, transfusing the first layer on a part build surface using a transfusion assembly to build the 3D part in a layer-by-layer manner on a part build platform such that a portion of the first layer further builds a fiducial structure in a layer-by-layer manner on the part build platform, measuring a height of the fiducial structure, computing an error between the measured height of the fiducial structure and a target height, adjusting a parameter of the at least one electrostatography engine as a function of the error, developing a second layer using the at least one electrostatography engine in accordance with the adjusted parameter, and transfusing the second layer using the transfusion assembly to further build the 3D part.

19 Claims, 11 Drawing Sheets

(56) References Cited

U.S. PATENT DOCUMENTS

| | | |
|---|---|---|
| 8,765,045 B2 | 7/2014 | Zinniel |
| 8,879,957 B2 | 11/2014 | Hanson et al. |
| 2011/0186081 A1 | 8/2011 | Dunn et al. |
| 2013/0186549 A1 | 7/2013 | Comb et al. |
| 2013/0186558 A1* | 7/2013 | Comb .................... B33Y 30/00 156/277 |
| 2015/0266242 A1* | 9/2015 | Comb .................. B29C 64/106 264/40.1 |
| 2016/0339646 A1* | 11/2016 | Baecker ................ B29C 64/147 |

* cited by examiner

HEIGHT CONTROL IN SELECTIVE DEPOSITION BASED ADDITIVE MANUFACTURING OF PARTS

CROSS REFERENCE TO RELATED APPLICATION(S)

The present Application claims the benefit of U.S. Provisional Patent Application Ser. No. 62/612,083 entitled HEIGHT CONTROL IN ELECTROSTATOGRAPHY-BASED ADDITIVE MANUFACTURING OF PARTS that was filed on Dec. 29, 2017, the contents of which are incorporated by reference in its entirety.

BACKGROUND

The present disclosure relates to additive manufacturing systems for producing three-dimensional (3D) parts and support structures. In particular, the present disclosure relates to selective deposition based additive manufacturing systems for producing 3D parts, and methods of producing 3D parts using the systems.

Additive manufacturing systems are used to build 3D parts from digital representations of the 3D parts (e.g., AMF and STL format files) using one or more additive manufacturing techniques. Examples of additive manufacturing techniques include extrusion-based techniques, ink jetting, selective laser sintering, powder/binder jetting, electron-beam melting, stereolithographic, and electrophotographic processes. For each of these techniques, the digital representation of the 3D part is initially sliced into multiple horizontal layers. For each sliced layer, a tool path is then generated, which provides instructions for the particular additive manufacturing system to form the given layer.

In an electrostatographic 3D printing or production process, each slice of the digital representation of the 3D part is printed or developed using an electrostatographic engine. The electrostatographic engine generally operates in accordance with 2D electrostatographic printing processes, but with a polymeric toner. The electrostatographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which successive layers are transfused to previously printed layers with heat and/or pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

In one aspect, the present disclosure is directed to a method of operating a selective deposition based additive manufacturing system capable of producing a three-dimensional (3D) part includes developing a first layer using at least one electrostatography engine, transfusing the first layer on a part build surface using a transfusion assembly to build the 3D part in a layer-by-layer manner on a part build platform such that a portion of the first layer further builds a fiducial structure in a layer-by-layer manner on the part build platform, measuring a height of the fiducial structure, computing an error between the measured height of the fiducial structure and a target height, adjusting a parameter of the at least one electrostatography engine as a function of the error, developing a second layer using the at least one electrostatography engine in accordance with the adjusted parameter, and transfusing the second layer using the transfusion assembly to further build the 3D part. The first layer includes at least one of a part material and a support material.

In another aspect, a method of operating a selective deposition based additive manufacturing system capable of producing a three-dimensional (3D) part includes developing a first layer using a plurality of electrostatography engines, transfusing the first layer on a part build surface using a transfusion assembly to build the 3D part in a layer-by-layer manner on a part build platform such that a portion of the first layer further builds a fiducial structure in a layer-by-layer manner on the part build platform, measuring a height of the fiducial structure over an area, determining an average height of at least a portion of the fiducial structure over the area, computing an error between the average height of the fiducial structure and a target height, adjusting a parameter associated with at least one of the plurality of electrostatography engines as a function of the error, and developing a second layer using the at least one of the plurality of electrostatography engines in accordance with the adjusted parameter. The fiducial structure can include a rail substantially aligned with a direction of movement during transfusion of the first layer. The first layer can include both a part material and a support material.

The present summary is provided only by way of example, and not limitation. Other aspects of the present invention will be appreciated in view of the entirety of the present disclosure, including the entire text, claims and accompanying figures.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the for nation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All references cited herein are incorporated by reference in their entireties.

Figure 1:
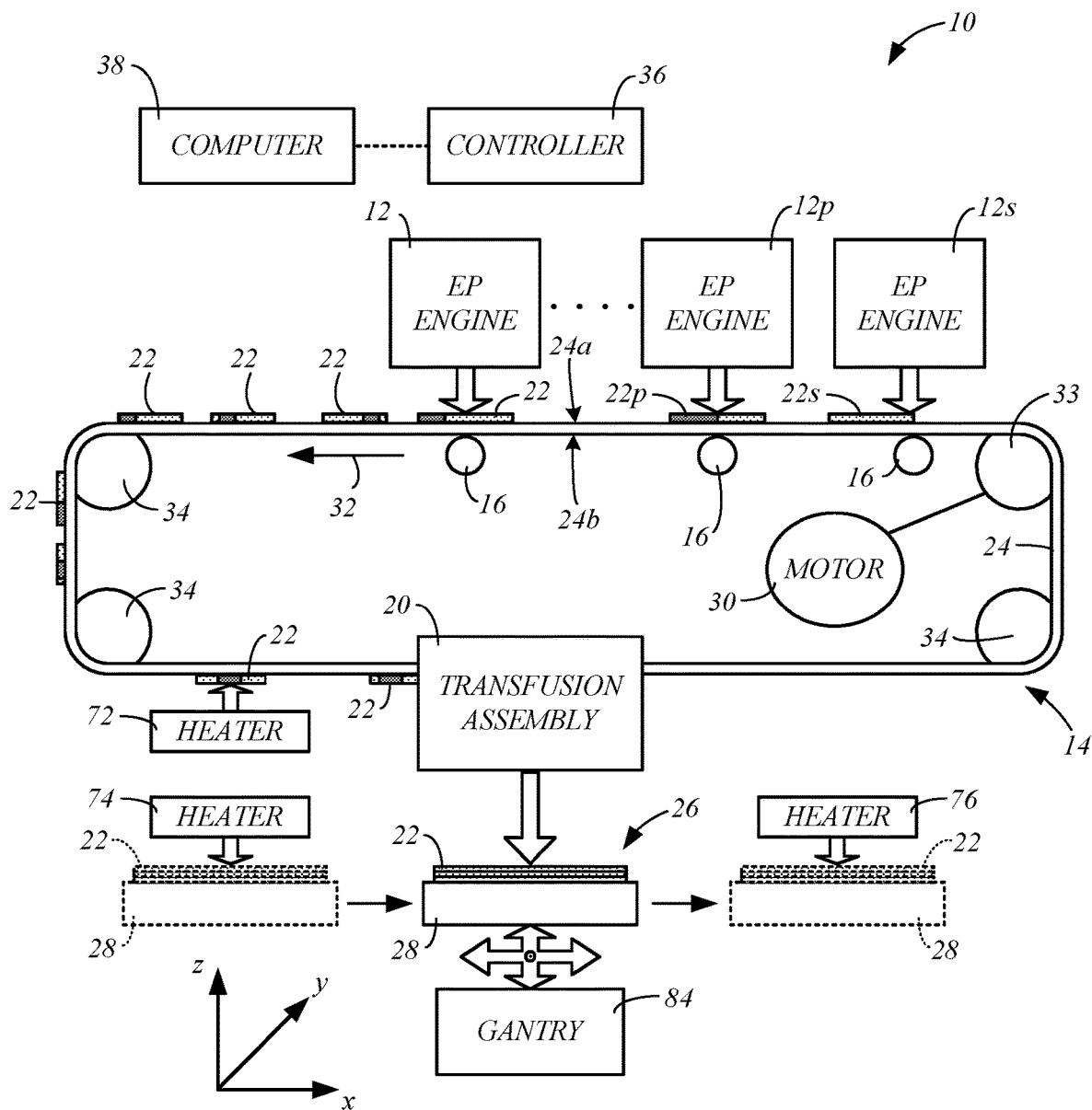
FIG. 1 is a simplified diagram of an example selective deposition based additive manufacturing system for printing 3D parts and associated support structures, in accordance with embodiments of the present disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to selective deposition based additive manufacturing systems for printing 3D parts that utilizes electrostatographic engines to produce layers of part and optional support material, and methods of printing 3D parts using such systems. As mentioned above, during an electrostatographic 3D part additive manufacturing or printing operation, an electrostatography engine can develop each layer of the 3D part (and any associated support material) out of a polymeric toner or powder-based material using an electrophotographic process. The developed layers are then transferred to a transfer medium (e.g., a flexible belt), which conveys the layers to a transfusion assembly where those layers are transfused (e.g., using heat and/or pressure) to build a 3D part and support structures in a layer-by-layer manner.

It is desirable to have relatively high precision when building 3D parts in a layer-by-layer manner, but numerous factors can lead to variations in a height of the layers of the 3D part over time. In a Cartesian coordinate system having mutually orthogonal z-, x- and y-axes, the accumulated (z) height of a layer at a particular (x,y) position on a top surface of a part build surface is related to the mass per unit area (M/A) of the previously deposited layers at that position, and the extent that the material(s) of the layers have been consolidated into a dense solid. There are additional secondary effects, such as offsetting (e.g., only partial transfer of the layer from a transfer medium to the part build surface) and skidding or rolling-pinning (e.g., x-y translation of the layer on or in the part due to shear stress) during transfusion. To get an appreciation for the precision required of the M/A control for electrophotography-based additive manufacturing systems, consider standard injection molding dimensional tolerances. A 2.000 inch (z) height part dimension should typically be held to +/−0.003+/−2 inches*0.003/inch, or +/−0.009 inches. That 2 inch high 3D part, when additively manufactured in a layer-by-layer manner, may be composed of at least 2,667 layers of material, where each layer consolidates to 0.75 mils. If accuracy comparable to that of standard injection molding is to be achieved by open loop control of layer thickness in layer-by-layer additive manufacturing, that layer thickness has to be precise to +/−0.009 inches/2,667 layers, or +/−7 nanometers/layer. These precision concerns are even more challenging in typical electrophotography-based additive manufacturing applications, where generally at least one part material and at least one support material populate a given layer, printed by different electrostatography engines with different control parameters. The accumulated heights of all of these materials need to substantially match, in part because at a particular (x,y) position, the composition of the underlying material from previously-built layers might switch several times between material types. The present disclosure provides a system and method with improved precision and control of layer heights, as discussed further below.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

FIG. 1 is a simplified diagram of an example electrophotography-based additive manufacturing system 10 for printing 3D parts and associated support structures, in accordance with embodiments of the present disclosure. As shown in FIG. 1, system 10 includes one or more EP engines, generally referred to as 12, such as EP engines 12$p$ and 12$s$, a transfer assembly 14, biasing mechanisms 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

The EP engines 12$p$ and 12$s$ are imaging engines for respectively imaging or otherwise developing layers, generally referred to as 22, of the powder-based part and support materials, where the part and support materials are each preferably engineered for use with the particular architecture of the EP engine 12$p$ or 12$s$. As discussed below, the developed layers 22 are transferred to a transfer medium 24 of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al., U.S. Patent Application Publication Nos. 2013/0186549 and 2013/0186558. In some embodiments, the belt 24 includes front surface 24$a$ and rear surface 24$b$, where front surface 24$a$ faces the EP engines 12, and the rear surface 24$b$ is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The example transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24$a$ that receives the layers 22, and other components.

The EP engine 12$s$ develops layers of powder-based support material, and the EP engine 12$p$ develops layers of powder-based part/build material. In some embodiments, the EP engine 12$s$ is positioned upstream from the EP engine 12$p$ relative to the feed direction 32, as shown in FIG. 1. In alternative embodiments, the arrangement of the EP engines 12$p$ and 12$s$ may be reversed such that the EP engine 12$p$ is upstream from the EP engine 12$s$ relative to the feed direction 32. In further alternative embodiments, system 10 may include three or more EP engines 12 for printing layers of additional materials, as indicated in FIG. 1.

System 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner.

The components of system 10 may be retained by one or more frame structures (not shown for simplicity). Additionally, the components of system 10 may be retained within an enclosable housing (not shown for simplicity) that prevents components of the system 10 from being exposed to ambient light during operation.

Figure 2:
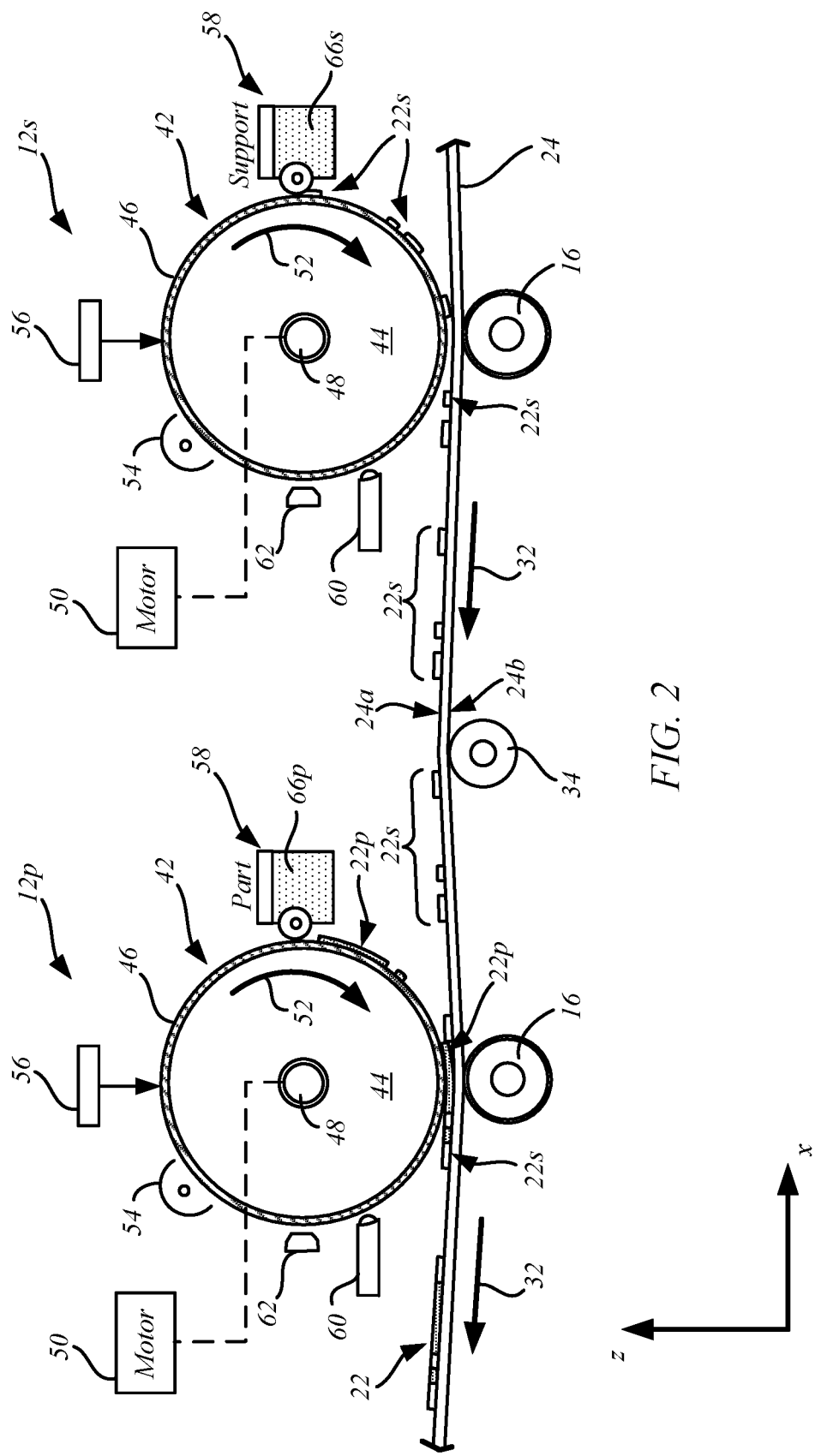
FIG. 2 is a schematic front view of a pair of example electrophotography (EP) engines of the system for developing layers of the part and support materials.

FIG. 2 is a schematic front view of the EP engines 12$s$ and 12$p$ of the system 10, in accordance with example embodiments of the present disclosure. In the illustrated embodiment, the EP engines 12$p$ and 12$s$ may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 is a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the example EP engines 12$p$ and 12$s$ also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

Each of the EP engines 12 uses the powder-based material (e.g., polymeric or thermoplastic toner), generally referred to herein by reference character 66, to develop or form the layers 22. In some embodiments, the image-forming assembly for the surface 46 of the EP engine 12s is used to form support layers 22s of powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p of powder-based part material 66p, where a supply of the part material 66p may be retained by the development station 58 (of the EP engine 12p) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

Each imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid-state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. As such, as used herein, the term "electrophotography" includes ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 12 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums 36 of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to print or build the 3D part 26 and support structure.

Figure 3:
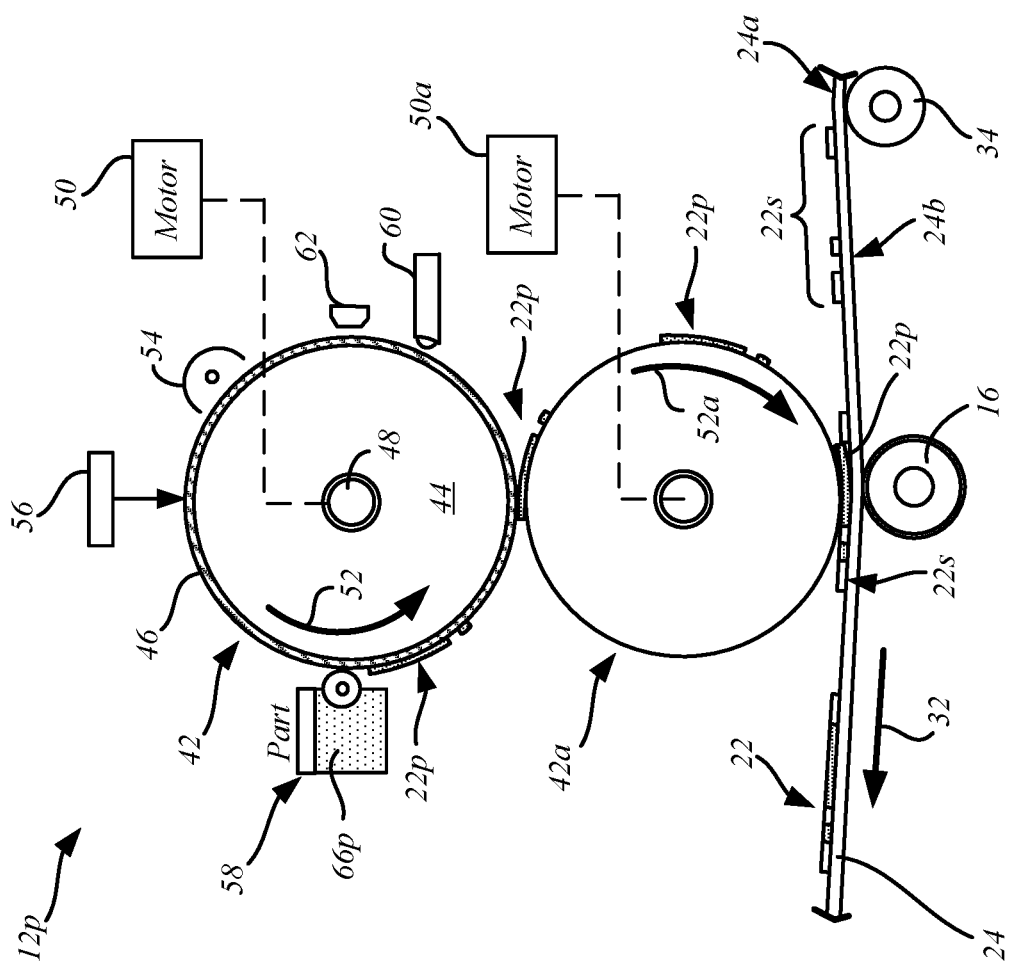
FIG. 3 is a schematic front view of an example electrophotography engine, which includes an intermediary drum or belt.

In a further alternative embodiment, one or both of the EP engines 12p and 12s may also include one or more intermediary transfer drums and/or belts between the photoconductor drum 42 and the belt or transfer medium 24. For example, as shown in FIG. 3, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 4:
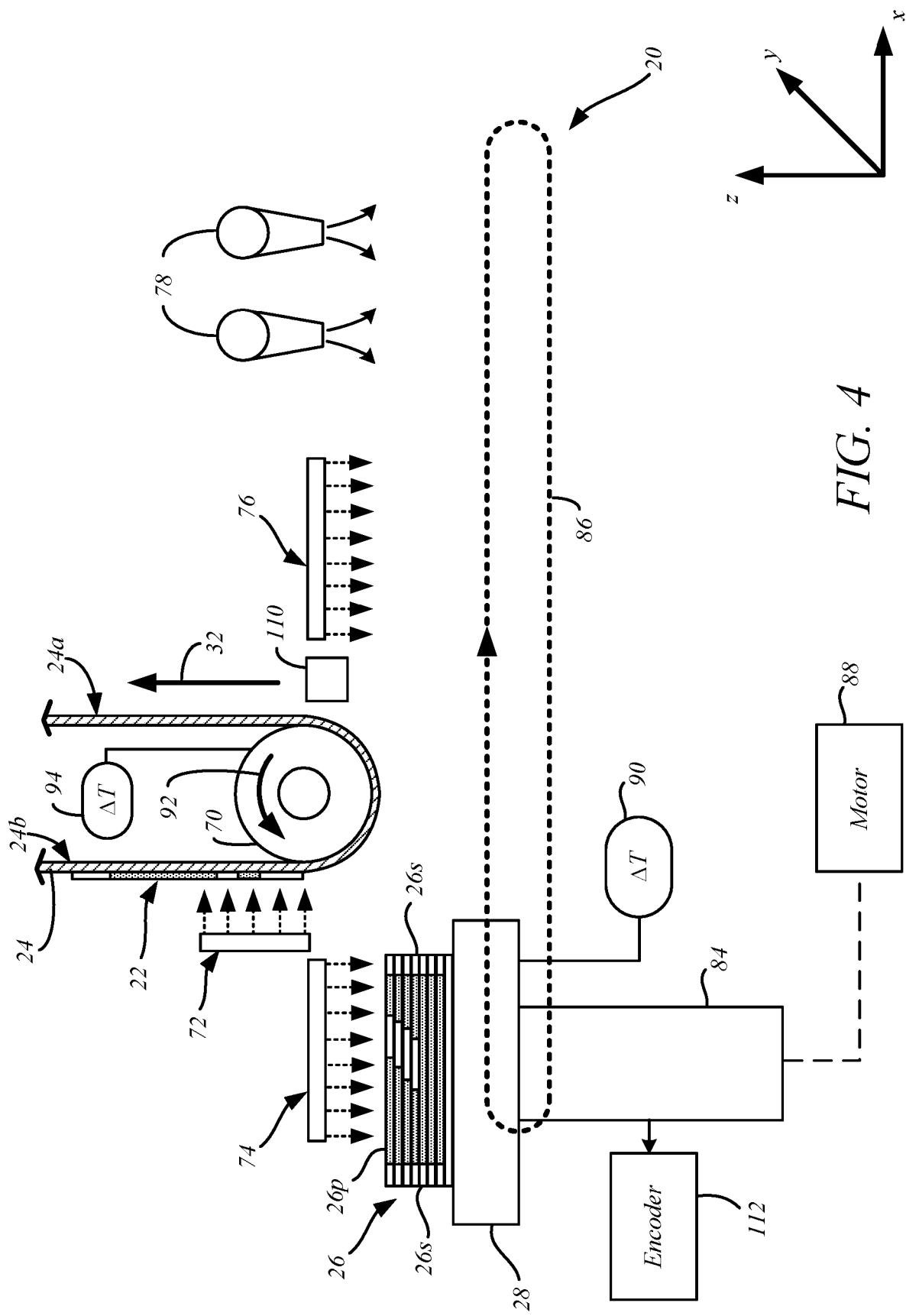
FIG. 4 is a schematic front view of an example transfusion assembly of the system for performing layer transfusion steps with the developed layers.

FIG. 4 illustrates an embodiment of the layer transfusion assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis and the x-axis (and, optionally, also the y-axis), as illustrated schematically in FIG. 1 (the y-axis being into and out of the page in FIG. 1, with the z-, x- and y-axes being mutually orthogonal, following the right-hand rule). The gantry 84 may produce cyclical movement patterns relative to the nip roller 70 and other components, as illustrated by broken line 86 in FIG. 4. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in the z- and x-axis directions (and optionally the y-axis direction). In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature.

The nip roller 70 is an example heatable element or heatable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

As mentioned above, the support material 66s of the present disclosure used to form the support layers 22s and the support structure 26s, preferably has a melt rheology that is similar to or substantially the same as the melt rheology of the part material 66p of the present disclosure used to form the part layers 22p and the 3D part 26p. This allows the part and support materials 66p and 66s of the layers 22p and 22s to be heated together with the heater 72 to substantially the same transfer temperature, and also allows the part and support materials 66p and 66s at the top surfaces of the 3D part 26p and support structure 26s to be heated together with heater 74 to substantially the same temperature. Thus, the part layers 22p and the support layers 22s may be transfused together to the top surfaces of the 3D part 26p and the support structure 26s in a single transfusion step as the combined layer 22.

Optional post-transfusion heater 76 is located downstream from nip roller 70 and upstream from air jets 78, and is configured to heat the transfused layers 22 to an elevated temperature. Again, the close melt rheologies of the part and support materials 66p and 66s allow the post-transfusion heater 76 to post-heat the top surfaces of 3D part 26p and support structure 26s together in a single post-fuse step.

As mentioned above, in some embodiments, prior to building the part 26 on the build platform 28, the build platform 28 and the nip roller 70 may be heated to their desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not melted.

As further shown in FIG. 4, during operation, the gantry 84 may move the build platform 28 (with 3D part 26p and support structure 26s) in a reciprocating pattern 86. In particular, the gantry 84 may move the build platform 28 along the x-axis below, along, or through the heater 74. The heater 74 heats the top surfaces of 3D part 26p and support structure 26s to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26p and support structure 26s to about the same temperatures to provide a consistent transfusion interface temperature. Alternatively, the heaters 72 and 74 may heat layers 22 and the top surfaces of 3D part 26p and support structure 26s to different temperatures to attain a desired transfusion interface temperature.

The continued rotation of the belt 24 and the movement of the build platform 28 align the heated layer 22 with the heated top surfaces of 3D part 26p and support structure 26s with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24b of the belt 24 to rotate around the nip roller 70 to nip the belt 24 and the heated layer 22 against the top surfaces of 3D part 26p and support structure 26s. This presses the heated layer 22 between the heated top surfaces of 3D part 26p and support structure 26s at the location of the nip roller 70, which at least partially transfuses the heated layer 22 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24. Additionally, as discussed above, the close melt rheologies of the part and support materials allow them to be transfused in the same step.

After release, the gantry 84 continues to move the build platform 28 along the x-axis to the post-transfusion heater 76. At post-transfusion heater 76, the top-most layers of 3D part 26p and the support structure 26s (including the transfused layer 22) may then be heated to at least the fusion temperature of the thermoplastic-based powder in a post-fuse or heat-setting step. This melts the material of the transfused layer 22 to a highly fusable state such that polymer molecules of the transfused layer 22 quickly interdiffuse to achieve a high level of interfacial entanglement with 3D part 26p and support structure 26s.

Additionally, as the gantry 84 continues to move the build platform 28 along the x-axis past the post-transfusion heater 76 to the air jets 78, the air jets 78 blow cooling air towards the top layers of 3D part 26p and support structure 26s. This actively cools the transfused layer 22 down to the average part temperature, as discussed in Comb et al., U.S. Patent Application Publication Nos. 2013/0186549 and 2013/0186558.

To assist in keeping the 3D part 26p and support structure 26s at the average part temperature, in some preferred embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes. Examples of suitable surface treatment processes include those disclosed in Priedeman et al., U.S. Pat. No. 8,123,999; and in Zinniel, U.S. Pat. No. 8,765,045.

Figure 5:
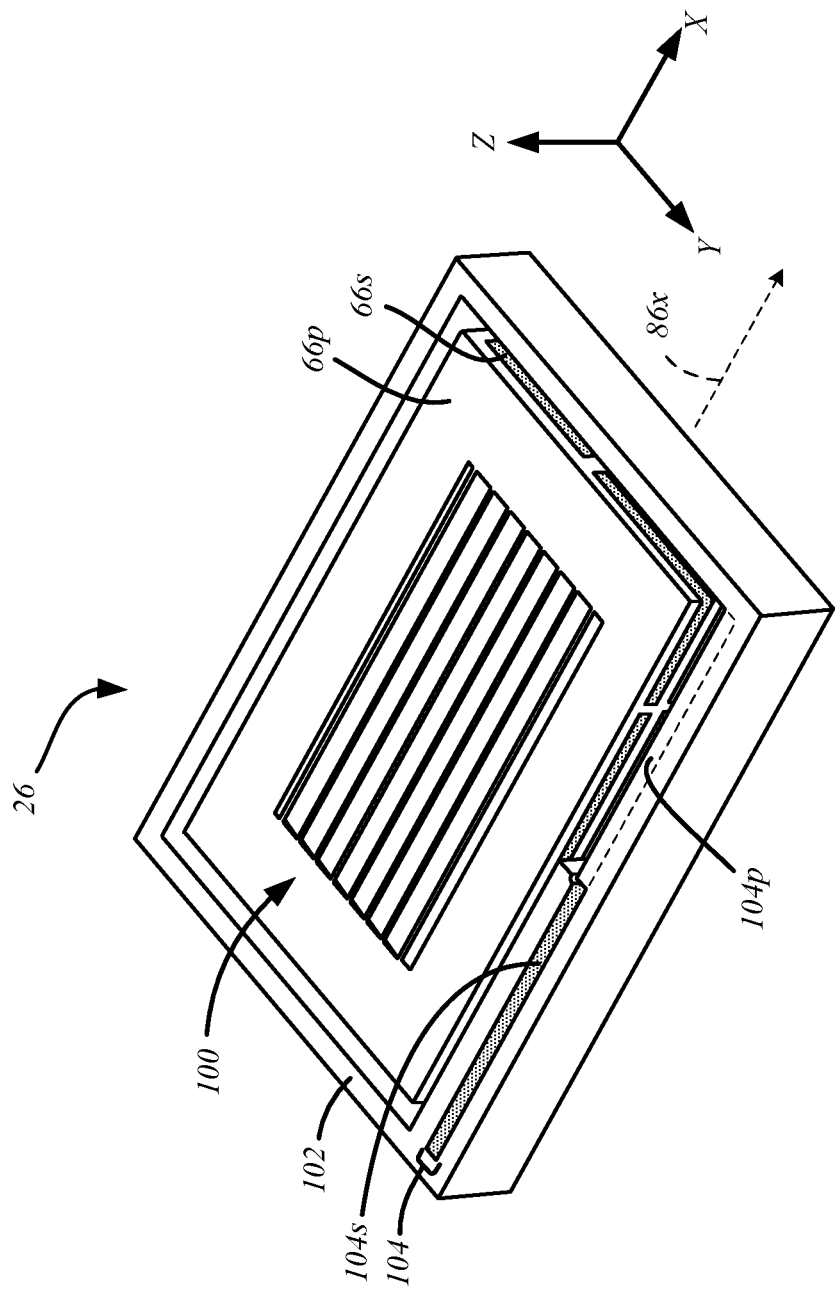
FIG. 5 is a perspective view of an example 3D part with a fiducial structure.

FIG. 5 is a perspective view of an example 3D part 26 that includes object region 100, border frame 102, and fiducial structure 104. In the illustrated embodiment, 3D part 26 is positioned relative to the x-, y- and z-axes, and a portion of reciprocating pattern 86 substantially aligned with the x-axis is designated by arrow 86x, which can be called an in-track direction or process direction in reference to operation of transfusion assembly 20 and a direction of movement of 3D part 26 during transfusion.

3D part 26 illustrated in FIG. 5 is show by way of example and not limitation. A nearly endless number of part configurations are possible in further embodiments. The illustrated object region 100 includes both part material 66p and support material 66s in a desired arrangement. Border frame 102 at least partially surrounds object region 100. Border frame 102 can be made of part material 66p. While shown as having a rectangular shape shaped from a perimeter of object region 100 in FIG. 5, border frame 102 can have other shapes in alternate embodiments. Moreover, border frame 102 can be omitted entirely in further embodiments.

Fiducial structure 104 is located inside border frame 102 and spaced from and external to object region 100 in the illustrated embodiment. As shown in FIG. 5, fiducial structure 104 includes rail 104s and rail 104p. Rail 104s can be made of support material 66s and rail 104p can be made of part material 66p. Rails 104s and 104p are illustrated as being contiguous with and adjoining frame 102, though other arrangements are possible in further embodiments, such as adjoining object region 100. Merely for reference purposes, a dashed line is shown in FIG. 5 to demark rail 104p from frame 102. Each rail 104s and 104p, in the illustrated embodiment, has an elongate, substantially cuboid shape, and rails 104s and 104p are arranged substantially colinearly (when transfused), adjoining each other, and substantially aligned with the in-track direction of movement during transfusion represented by arrow 86x. In further embodiments, rails 104s and 104p can have other shapes and/or arrangements. For instance, rails 104s and 104p can be arranged side-by-side in the cross track (i.e., y-axis) direction in an alternative embodiment. Moreover, while rails 104s and 104p are illustrated as having similar sizes and shapes to each other, rail 104s can be differently sized and/or shaped than rail 104p in further embodiments. As discussed further below, fiducial structure 104 can also include more than two rails. In general, having rails 104s and 104p each made exclusively from different materials 66s and 66p as in the illustrated embodiment allows for relatively simple isolation of EP engines 12s and 12p used to develop each type of material 66s and 66p, thereby allowing relatively precise control of each type of EP engine 12s and 12p in an efficient and convenient manner.

Figure 6A:
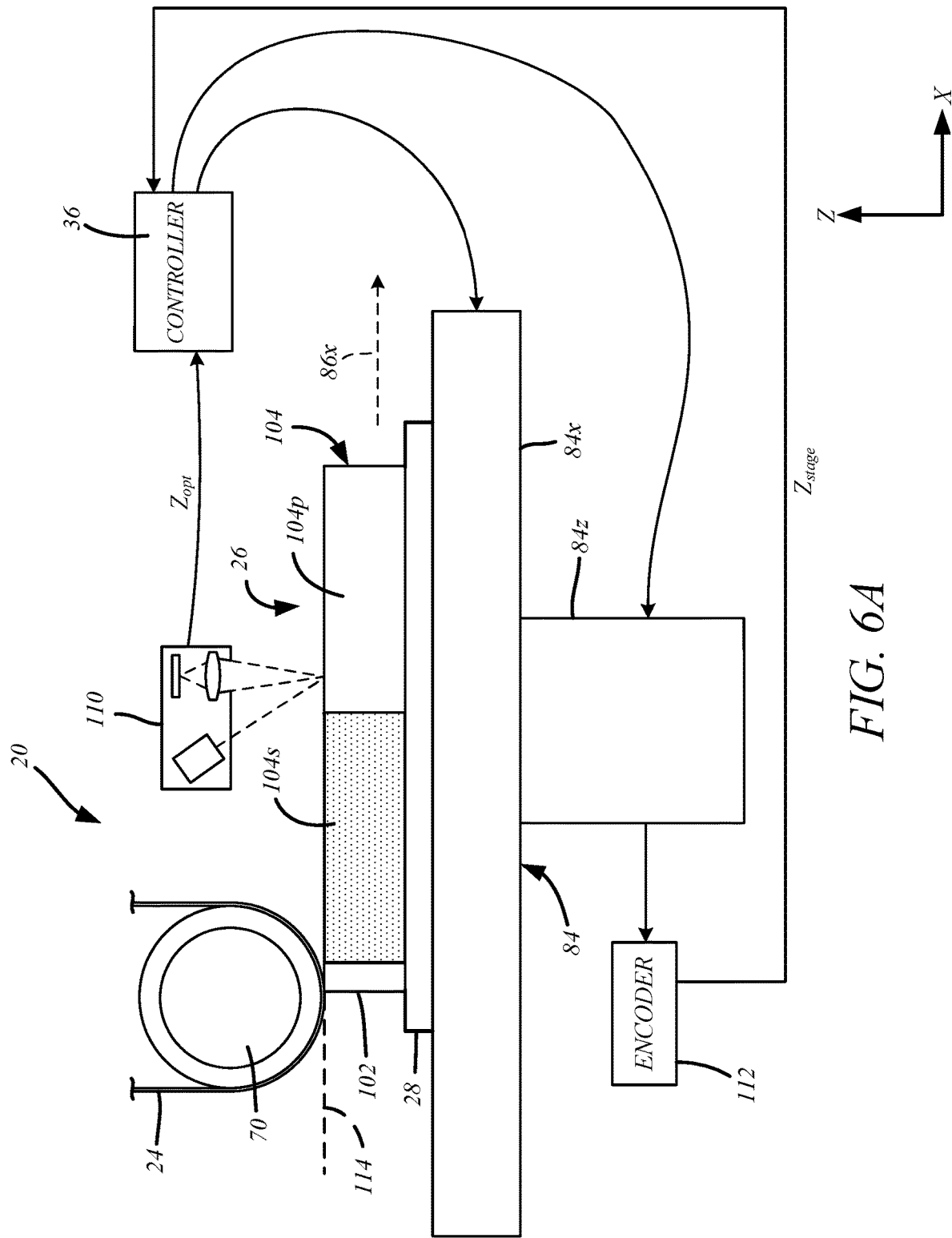
FIG. 6A is another schematic front view of the transfusion assembly and the 3D part of FIG. 5.

FIG. 6A is another schematic front view of a portion of electrophotography-based additive manufacturing system 10, illustrating portions of transfusion assembly 20 as well as 3D part 26 from FIG. 5 (shown in FIG. 6A in a schematic sectional form to reveal rails 104s and 104p of fiducial structure 104). As shown in FIG. 6A, transfusion assembly 20 includes sensor 110 and encoder 112, in addition to build platform 28, nip roller 70, and other components discussed above.

Sensor 110 can be a non-contacting range sensor, such as a staring optical range sensor with a plurality of sensing elements that produce discrete range detection outputs in parallel, and can be substantially fixed, such as having a fixed field of view for range measurement rather than being configured to scan parts. Sensor 110 can be positioned to sense portions of 3d part 26 that have passed by nip roller 70, that is, down-track from nip roller 70 in a post-transfusion region. In FIG. 4, sensor 110 is shown located in between nip roller 70 and post-transfusion heater 76, but sensor 110 could be located elsewhere in alternative embodiments, such as between post-transfusion heater 76 and air jets 78 or down-track from air jets 78. During operation, sensor 110 measures cumulative layer height deviation $z_{opt}$, which represents a deviation of the top of 3D part 26 (including fiducial structure 104) from plane 114, which is tangent to a bottom of the nip roller 70 and parallel to the in-track direction of movement during transfusion represented by arrow 86x (and generally horizontal as shown in FIG. 6A). One or more signals from sensor 110 indicative of cumulative layer height deviation $z_{opt}$ can be sent to controller 36, or another suitable processing unit. In embodiments where sensor 110 is a staring sensor, a plurality of output signals indicative of cumulative layer height deviation $z_{opt}$ in corresponding fields of view of the staring sensor sensing elements can all be transmitted to controller 36.

Encoder 112 can be any suitable electromechanical or other type of position sensing device. Gantry 84 can move build platform 28 using discrete stages that operate along discrete axes, such as x stage 84x along the x-axis and z stage 84z along the z-axis. In such embodiments, encoder 84 can be operatively connected to only z stage 84z. During operation, encoder 112 measures stage height $z_{stage}$, which represents a distance from a top surface of build platform 28 to plane 114. A signal from encoder 112 indicative of stage height $z_{stage}$ can be sent to controller 36 along with the signal(s) from sensor 110, or to another suitable processing unit.

Figure 6B:
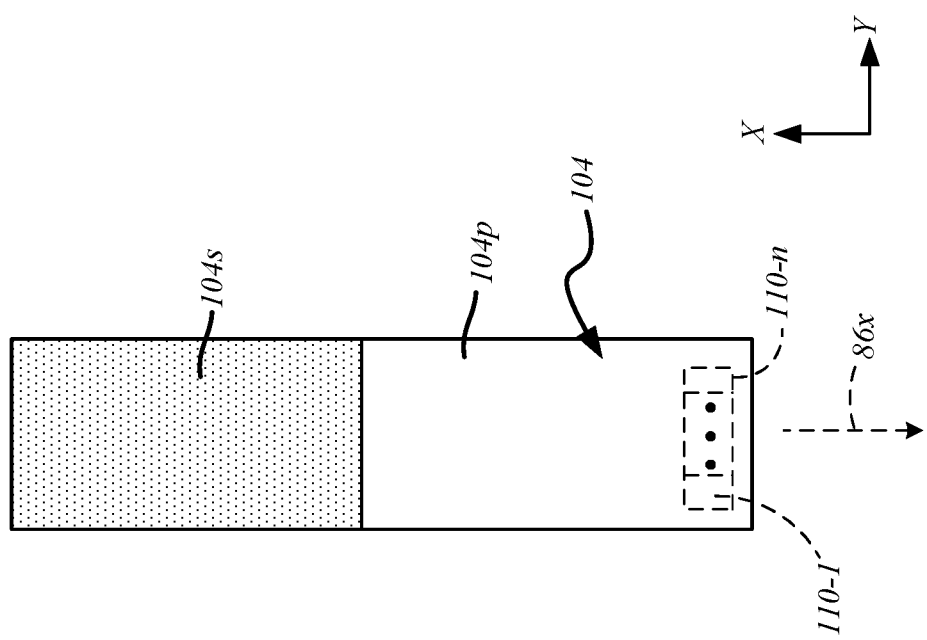
FIG. 6B is a schematic top view of range sensing fields of view for the fiducial structure, shown in isolation.

FIG. 6B is a schematic top view fiducial structure 104, shown in isolation. In the illustrated embodiment, fields of view 110-1 to 110-n of corresponding discrete optical staring sensor elements of a non-contacting optical staring sensor embodiment of sensor 110 are shown on fiducial structure 104 in dashed lines. Fields of view 110-1 to 110-n can be arranged in a colinear array extending substantially parallel to the y-axis, which is a transverse or cross-track direction relative to the in-track direction of movement during transfusion represented by arrow 86x. Moreover, each field of view 110-1 to 110-n can adjoin any neighboring fields of view 110-1 to 110-n without any intervening gaps, and can be spatially fixed. Fields of view 110-1 to 110-n are rectangular in FIG. 6B, but could have other shapes in alternative embodiments. In various embodiments, fields of view 110-1 to 110-n can encompass an entire y-axis dimension of fiducial structure 104, or a portion that is smaller than the entire y-axis dimension of fiducial structure 104. However, in some embodiments, fields of view 110-1 to 110-n can be limited to fiducial structure 104 such that object region 100 is located away from fields of view 110-1 to 110-n during part or all of the layer-by-layer building of 3D part 26. Fields of view 110-1 to 110-n can be limited by omitting sensor elements or by deactivating one or more selected sensor elements, in various embodiments. Such limitations on fields of view 110-1 to 110-n can be advantageous in reducing the complexity and cost of sensor 110 and associated computational hardware. Moreover, fixed fields of view 110-1 to 110-n can further reduce the complexity and cost of sensor 110, and can also avoid processing and/or building delays that could arise with the need to scan non-fixed sensor elements across 3D part 26.

During a transfusion operation for a given layer of 3D part 26, gantry 84 moves build platform 28 and accumulated layers of 3D part 26 in the in-track direction of movement represented by arrow 86x. In an embodiment with sensor 110 configured as a staring optical range sensor with a plurality of discrete sensor elements, movement of gantry 84 causes fiducial structure 104 to pass through fields of view 110-1 to 110-n and multiple range measurements (for each field of view 110-1 to 110-n in the y-axis direction) are taken along fiducial structure 104 in the x-axis direction a different portions of fiducial structure 104 pass through field of view 110-1 to 110-$n$, thereby providing cumulative layer height deviation $z_{opt}$ measurements over an area of a top surface of fiducial structure 104. The area over which the cumulative layer height deviation $z_{opt}$ measurements are taken is preferably as small as possible but at least 10 mm$^2$, but can be any suitable larger or smaller area in further embodiments. Where fiducial structure 104 includes colinear rails 104$s$ and 104$p$, fields of view 110-1 to 110-$n$ can pass through each rail sequentially (i.e., serially). In alternative embodiments, such as where rails 104$s$ and 104$p$ are located side-by-side in the cross-track direction, a sub-set of fields of view 110-1 to 110-$n$ can be dedicated to rail 104$s$ and another sub-set of fields of view 110-1 to 110-$n$ can be dedicated to rail 104$p$ such that rails 104$s$ and 104$p$ are scanned concurrently (i.e., in parallel). In this way, measurements of cumulative layer height deviation $z_{opt}$ can be taken during a typical transfusion operation without interruption or delay. Moreover, cumulative layer height deviation $z_{opt}$ measurements can be made of only fiducial structure 104, and no height measurements need to be taken of objection region 100 or frame 102. The relatively small top surface area of fiducial structure 104 that is measured avoids the need for additional sensors or more complex sensors (e.g., by reducing the number of discrete staring sensor elements), and allows for essentially real-time processing of the sensor data and real-time adjustments of operating parameters of EP engines 12, as discussed further below.

Using sensor 110 and encoder 112, and associated output signals, a measured height $H_m$ of the top surface (i.e., build surface) of 3D part 26 at the field(s) of view 110-1 to 110-$n$ of sensor 110 can be calculated as $z_{opt}+z_{stage}$. Such a calculation can be performed by controller 36, or other suitable circuitry. Where a staring sensor is used as sensor 110, signals for each field of view 110-1 to 110-$n$ (e.g., at different y-axis or cross-track locations) over time (e.g., at different x-axis positions of 3d part 26) representing cumulative layer height deviation $z_{opt}$ can be concatenated with the signal representing stage height $z_{stage}$ to provide an areal data set $H_{area}$ for at least a portion of fiducial structure 104 encompassed by all field(s) of view 110-1 to 110-$n$. The field(s) of view 110-1 to 110-$n$ of sensor 110 pass across 3D part 26, and specifically fiducial structure 104, every time build platform 28 passes along reciprocating pattern 86 as a new layer 22 is transfused onto the part build surface, allowing layer-by-layer (and layer-specific) height data to be collected. Although height data can be measured and collected exclusively for fiducial structure 104, because fiducial structure 104 is built layer-by-layer concurrently with object region 100 (and frame 102) using the same EP engines 12, layer-wise heights of only fiducial structure 104 can still be used to adjusting operating parameters of EP engines 12 to the benefit of object region 100 (and frame 102).

Figure 7:
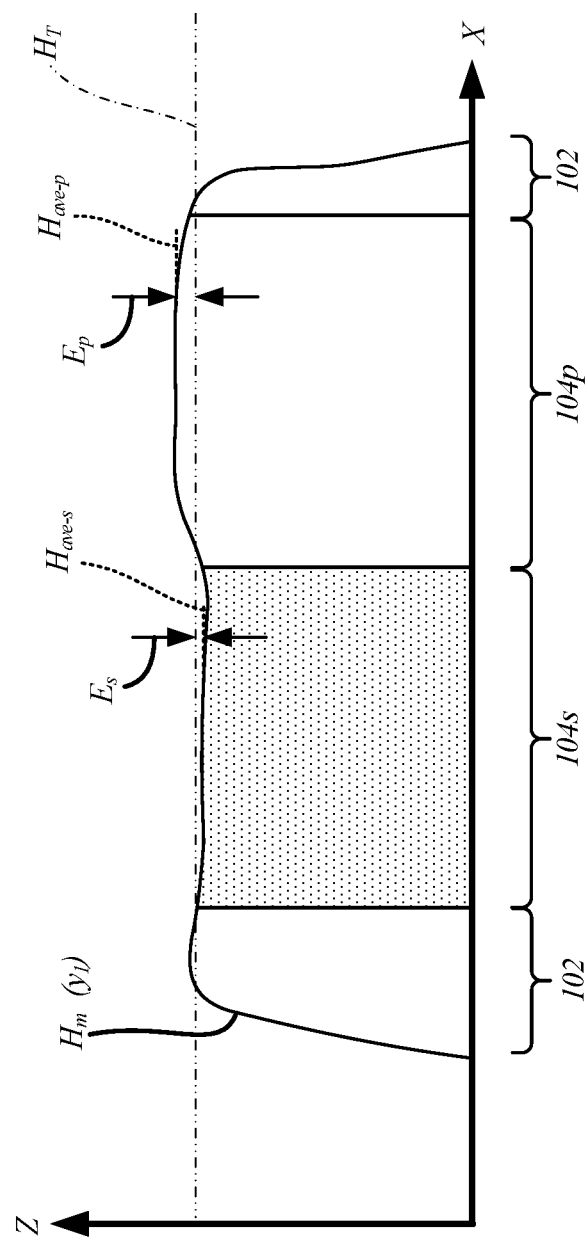
FIG. 7 is a schematic graph of a measured height of the 3D part of FIGS. 5, 6A and 6B.

FIG. 7 is a schematic graph of measured height $H_m(y_1)$ along an entire x-axis (in-track) dimension of 3D part 26 for y-axis (cross-track) location $y_1$, including along the entire x-axis dimension of fiducial structure 104 at y-axis location $y_1$. Portions of the plot of measured height $H_m(y_1)$ corresponding to frame 102, rail 104$s$ and rail 104$p$ are labeled in FIG. 7. Similar plots $H_m(y_2)$ to $H_m(y_n)$ (not shown) could be generated from data for one or more other y-axis locations $y_2$ to $y_n$, as well as a combined plot showing measured height over a given x-y area.

For a given layer of 3D part 26, there is a cumulative target (or expected) height $H_T$ based on a digital representation of 3D parts 26 (e.g., AMF and STL format files) and a thickness $T_L$ of associated slices of such a digital representation. A layer-wise error E can be calculated, representing difference between the cumulative target height $H_T$ and the measured height $H_m$, where the cumulative target height $H_T$ is equal to a number of layers $N_L$ times layer thickness $T_L$ (assuming equal thickness slices and layers). In one embodiment, an average, by area (e.g., over an area in an x-y plane), can be used, such that an average measured height $H_{ave}$ is used to calculate the error E instead of pixel-by-pixel (or voxel-by-voxel) calculations. A median or other similar value, by area, could be used instead of an average in alternate embodiments. Such an error calculation can be made independently for each rail 104$s$ and 104$p$, such that a cumulative support material rail 104$s$ layer-wise error $E_s=N_L*T_L-H_{ave-s}$, and a cumulative part material rail 104$p$ layer-wise error $E_p=N_L*T_L-H_{ave-p}$.

Calculation of layer-wise errors $E_s$ and $E_p$ allows operational variations of individual EP engines 12 to be identified and compensated for in a closed-loop manner when building 3D part 26. For instance, signals embodying layer-wise errors $E_s$ and $E_p$ can be used as inputs in proportional-integral-derivative (PID) control loops (e.g., using controller 36) to adjust one or more operational parameters of EP engines 12$s$ and 12$p$ when imaging, developing and/or transfusing subsequent layers 22. There are numerous settable parameters in each EP engine 12 that affect the image M/A. For example, a photoconductor bias voltage ($V_{bias}$) of photoconductor drum 42 (including conductive drum body 44 and photoconductive surface 46) sets the charge level in a given image, which in turn attracts a given amount of part material 66$p$ or support material 66$s$ of a fixed charge per unit mass. Varying a parameter such photoconductor bias voltage $V_{bias}$ allows the overall M/A of the image to be tuned. Similarly, light intensity or luminescence of imager device 56 can be tuned to affect the M/A of an image. Operational parameters of other components of electrophotography-based additive manufacturing system 10 could be adjusted in addition or in the alternative, in further embodiments. Moreover, operational parameters can be adjusted on an average basis for entire layers 22, rather than on a pixel-by-pixel or voxel-by-voxel basis. By adjusting one or more operational parameters when imaging, developing and/or transfusing layers 22, measured cumulative height(s) $H_m$ of layers of 3D part 26 (or average measured height $H_{ave}$) can be made to substantially agree with cumulative target height $H_T$ to a distance on the order of approximately +/−0.0001 inch, and measured cumulative heights $H_m$ for each rail 104$s$ and 104$p$ can be made to substantially agree with each other. In embodiments where average measured height $H_{ave}$ is utilized, the averaging of intra-layer variations and the adjustment of operational parameter by averages over entire layers 22 have been found to have negligible adverse impacts on overall height precision.

In some embodiments, this control process can be used to control the M/A of multiple EP engines 12 in common, such as by arbitrarily linking one or more operational parameters (e.g., voltage $V_{bias}$, luminescence, etc.) of a set of EP engines 12 at common settings, and likewise adjusting operational parameters of the set of EP engines 12 in common (i.e., based on a common error signal). For instance, two (or more) EP engines 12$p$ for part material 66$p$ could be commonly linked, and two (or more) EP engines 12$s$ for support material 66$s$ could be commonly linked, which still allowing separate control over the sets of linked EP engines 12$p$ and linked EP engines 12$s$.

As with many control loops, there may be constraints on how layer-wise errors E, $E_s$ and/or $E_p$ are allowed to modify operational parameters, or special cases where adjustments are not possible or are made in a different way. For example, for one or more initial layers 22 used to build 3D part 26 (e.g., at start-up of electrophotography-based additive manufacturing system 10), standard or best-last-used values of layer-wise errors E, $E_s$ and/or $E_p$ can be used. As another example, there can be slew-rate limits, range limits, and wind-up limits that constrain adjustment of certain operational parameters based on layer-wise errors E, $E_s$ and/or $E_p$. Furthermore, electrophotography-based additive manufacturing system 10 (and components thereof) may be subject to a maintenance schedule, which may be driven by detected variations from expected operational parameters. In such cases, adjustments of operational parameters may be subject to maintenance schedule limits, though, conversely, such adjustments to operational parameters might instead facilitate adjustment of maintenance schedules by allowing maintenance to be deferred.

The control process embodiments described above provide a relatively simple yet effective way to control layer-wise height with a relatively high degree of precision as 3D part 26 is built in a layer-by-layer manner. Instead of measuring height Z(x,y) for an entire part build surface, only fiducial structure 104 at a known position can be measured, thereby reducing the cost of sensor 110 by about 100×. Moreover, instead of operating EP engines 12 in a linear regime and, for instance, altering the luminescence of each pixel/voxel with imager 56 based on the desired local M/A, the average M/A of the entire image is adjusted (e.g., using a voltage $V_{bias}$ parameter).

The process and fiducial structure 104 described can have different implementations in further embodiments. Some such further embodiments are described here, though still further embodiments are contemplated.

Figure 8:
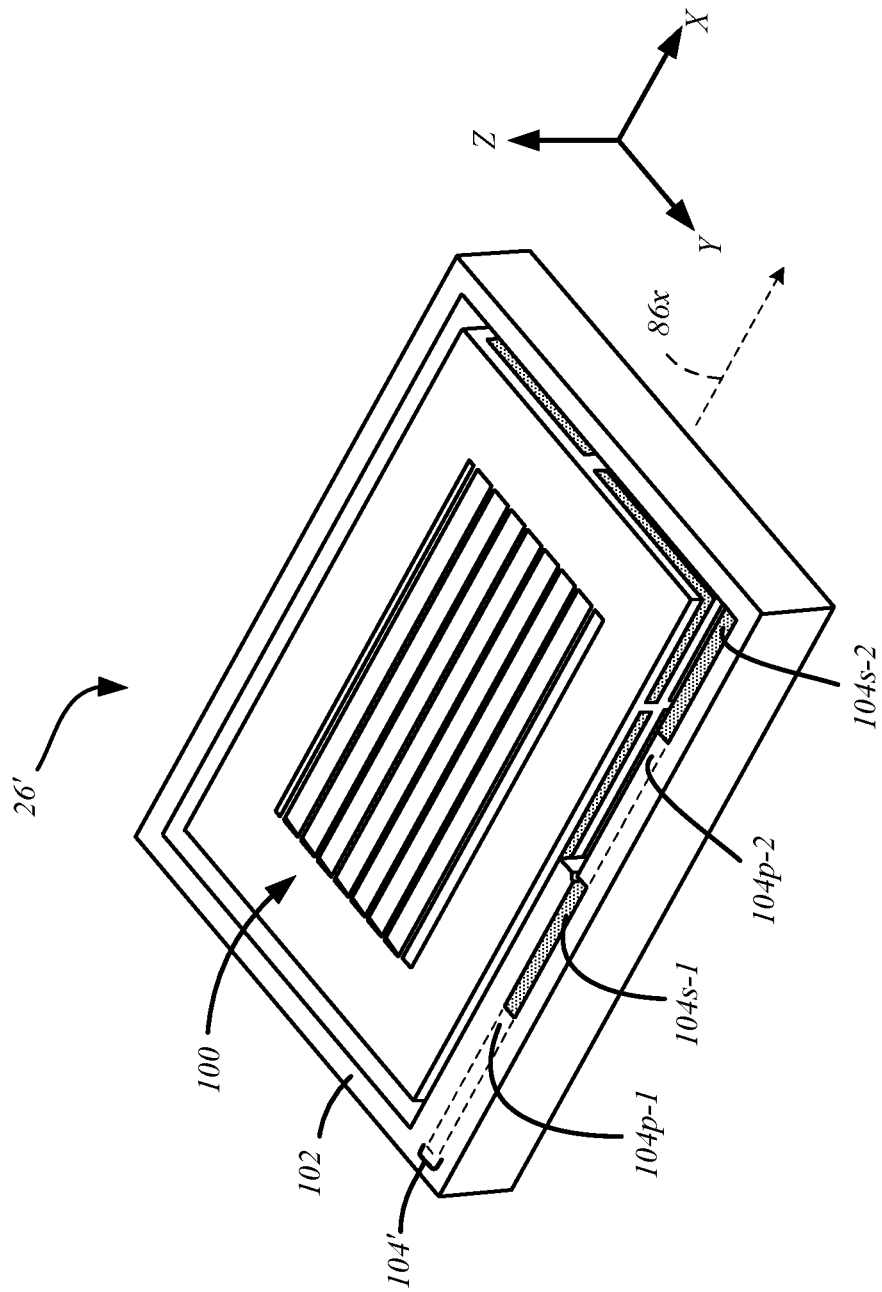
FIG. 8 is a perspective view of another example 3D part.

FIG. 8 is a perspective view of another example 3D part 26' that includes object region 100, border frame 102, and fiducial structure 104'. In the illustrated embodiment, 3D part 26' is positioned relative to the x-, y- and z-axes, and the in-track direction of movement of 3D part 26' during transfusion is represented by arrow 86x.

In an embodiment where electrophotography-based additive manufacturing system 10 includes multiple (e.g., two) EP engines 12s and multiple (e.g., two) EP engines 12p, each layer 22 might include multiple slices of a digital representation of 3D part 26', with one or more EP engines 12s and one or more EP engines 12p dedicated to each slice used to develop a given layer 22. It is possible to compensate for relative thinness of developed layers 22 by electrostatically transferring two or more images (or sub-layers) on top of each other within a single image frame on transfer medium 24, for instance; the height increment created when this layer 22 is developed and transfused is the combined contribution of the two or more images/sub-layers. In such an embodiment, fiducial structure 104' can include a dedicated rail for each EP engine 12. As shown in FIG. 8, fiducial structure 104' includes rails 104p-1 and 104p-2 each built from part material 66p by a corresponding, dedicated EP engine 12p, and rails 104s-1 and 104s-2 each built from support material 66s by a corresponding, dedicated EP engine 12s. In the illustrated embodiment, rails 104p-1, 104p-2, 104s-1 and 104s-2 are all arranged colinearly (when transfused), adjoining each other, and substantially aligned with the in-track direction of movement during transfusion represented by arrow 86x. Moreover, rails 104p-1 and 104p-2 of part material 66p alternate with rails 104s-1 and 104s-2 of support material 66s in the illustrated embodiment. Other arrangements, such as side-by-side or spaced arrangements are possible in further embodiments. Moreover, fiducial structure 104' can include nearly any number of rails in further embodiments, with one or more rails built by one or more dedicated EP engines 12. Layer-wise height measurement, error calculation and process control for 3D part 26' can proceed in much the same manner as described above, with separate control loops established for each rail/EP engine grouping.

In another embodiment, measured data for multiple rails of a fiducial structure is concatenated based on a combinatorial approach to building those rails using multiple EP engines 12. For instance, a fiducial structure with four rails i to iv built using four EP engines A to D can be built in the following manner: rail i is built using EP engines A and B; rail ii is built using EP engines A and C; rail iii is built using EP engines C and D; and rail iv is built using EP engines B and D. The contribution of each EP engine A-D is extracted from combined signals representing measured heights $H_m$ for each of the rails i-iv, and at least one operational parameter of each EP engine A-D can be independently controlled when imaging, developing and/or transfusing subsequent layers. Other combinatorial approaches to construction and measurement of fiducial structures are possible as well.

Figure 9A:
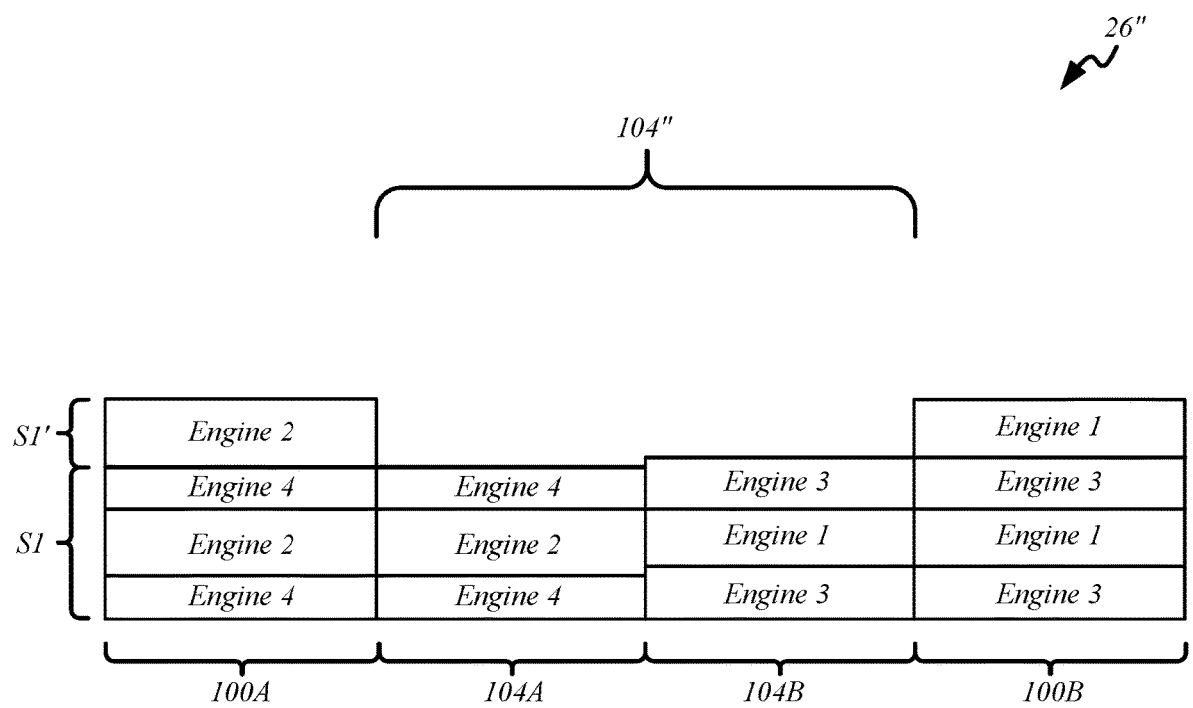
FIGS. 9A and 9B are schematic representations of combinatorial EP engine assignments at different levels of completion of building a 3D part.
Figure 9B:
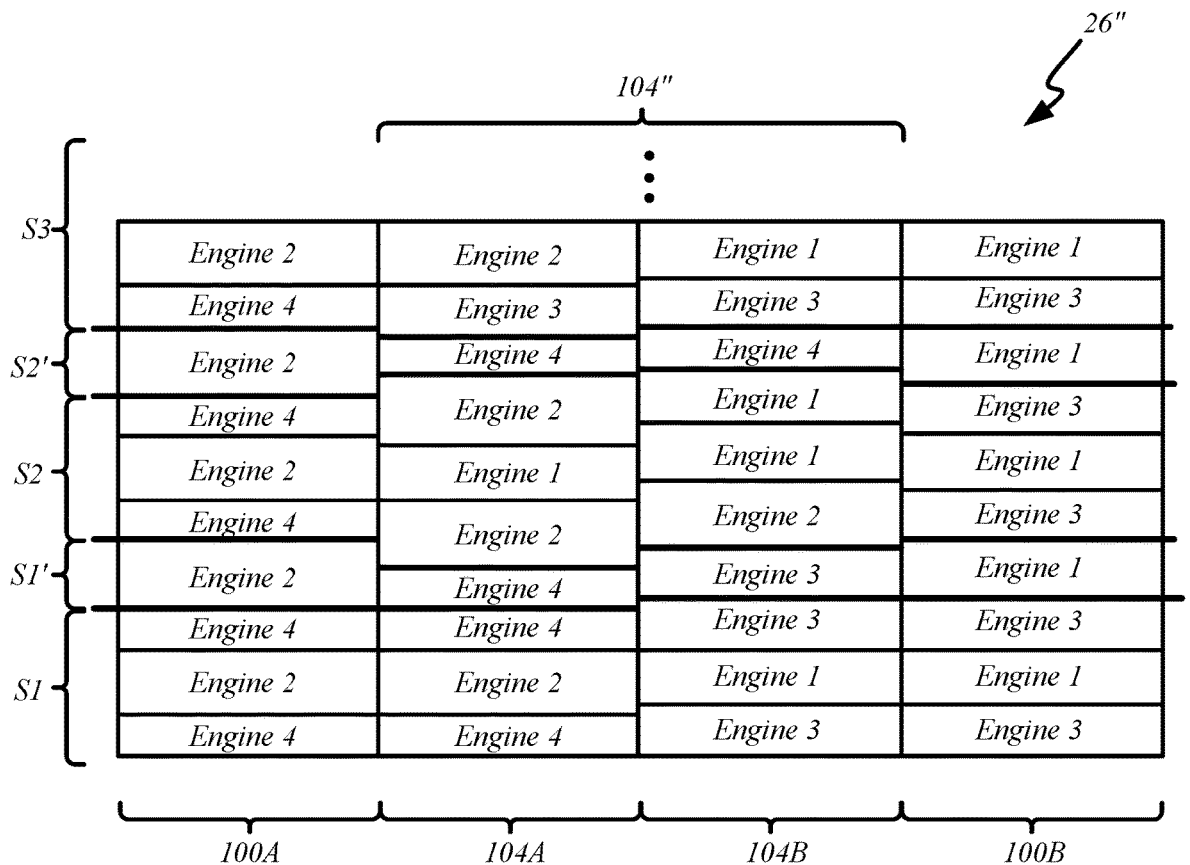

FIGS. 9A and 9B are schematic representations of combinatorial EP engine assignments at different levels of completion of building 3D part 26". It should be noted that the representations in FIGS. 9A and 9B are highly schematic, and are not meant to represent an actual layout of build materials. Moreover, the particular combinatorial EP engine assignments are shown by way of example and not limitation.

For an electrophotography-based additive manufacturing system 10 utilizing an even number n of EP engines 12, wherein n=4 in the illustrated embodiment, half (engines 1 and 2 in the illustrated embodiment) develop part material 66p and the other half (engines 3 and 4) develop support material 66s. 3D part 26" has object regions 100A and 100B and fiducial structure 104" having fiducial regions (e.g., rails) 104A and 104B. In this way, 3D part 26" is conceptualized as having n distinct regions when built using n EP engines, and n/2 distinct regions of fiducial structure 104", where n=4 as illustrated. Each EP engine can be used to develop a region of at least one layer each n layers, such that good measurement data can be collected to calculate an error E for n/2 EP engines every n layers.

As 3D part 26" is built, the EP engines used to build fiducial regions 104A and 104B of fiducial structure 104" are combinatorially varied over a set S1 of n−1 layers (or another odd number of layers). Over an odd number of layers, one EP engine will have contributed more than another. In the illustrated embodiment, engine 4 contributes two layers and engine 2 contributes one layer in both fiducial region 104A and object region 100A, and engine 3 contributes two layers and engine 1 contributes one layer in both fiducial region 104B and object region 100B. EP engines used to build object region 100A can be paired with the EP engines used to build fiducial region 104A, and EP engines used to build object region 100B can be paired with the EP engines used to build fiducial region 104B. Thus, in the illustrated embodiment, engine 4 contributes two layers and engine 2 contributes one layer in object region 100A (in the same order as in fiducial region 104A), and engine 3 contributes two layers and engine 1 contributes one layer in object region 100b (in the same order as in fiducial region 104B).

Next, as shown in FIG. 9A, a set of one or more layers S1' is built using individual, unpaired EP engines. In the illustrated embodiment, engine 2 builds an unpaired layer at object region 100A and engine 2 builds an unpaired layer at object region 100B.

One or more height measurement(s) of 3D part 26" are taken at least after sets S1 and S1' of layers are built (or optionally after each layer is built). These height measurements allow a layer-wise error E to be calculated for one EP engine for each region 104A and 104B after sets S1 and S1' of layers are built. In the illustrated embodiment, after sets S1 and S1' are built, an error $E_p$ is calculated for engine 4 based on measured height $H_m$ corresponding to fiducial region 104A, and an error $E_s$ is calculated for engine 3 based on measured height $H_m$ corresponding to fiducial region 104B. Differences between object regions 100A and 100B and fiducial regions 104A and 104B allow isolation of height measurements for an individual EP engine (e.g., engines 3 and 4 in FIG. 9A). A suitable number of additional unpaired layer builds can then be performed to complete layers in all other regions at the height of set S1'.

Next, an operational parameter of each of the EP engines for which errors are calculated (e.g., engines 3 and 4) is adjusted. Subsequent layers can be built using the adjusted parameters for the associated EP engines.

As shown in FIG. 9B, this process is repeated in a similar manner for an additional set of n-1 layers S2, and an additional set of one or more layers S2'. However, sets of layers S2 and S2' utilize a different combination of EP engines than sets S1 and S1', thereby allowing height measurements to isolate an error for different EP engines. In the illustrated embodiment, after sets S2 and S2' are built, an error $E_p$ is calculated for engine 2 based on measured height $H_m$ corresponding to fiducial region 104A, and an error $E_s$ is calculated for engine 1 based on measured height $H_m$ corresponding to fiducial region 104B. Next, an operational parameter of each of the EP engines for which errors are calculated (e.g., engines 1 and 2) is adjusted. Subsequent layers (e.g., set S3) can be built using the adjusted parameters for the associated EP engines. It can thus be seen that in some embodiments, each EP engine does not need to be adjusted each layer, though precision height control can still be accomplished.

In addition to or in the alternative to adjusting EP engine operational parameters based on an error E, usage of EP engines can be selected to compensate for thickness variations between EP engines based on the error E. For instance, usage of an EP engine producing thicker than intended layers can be alternated with usage of an EP engine producing thinner than intended layers, such that accumulated layer height is as intended.

In some embodiments, the fiducial structure is separate from the part or support structure being printing. In other embodiments, the fiducial structure is a portion of the part or support structure being printed.

Although the present disclosure has been described with reference to preferred embodiments, workers skilled in the art will recognize that changes may be made in form and detail without departing from the spirit and scope of the disclosure.

The invention claimed is:

1. A method of operating a selective deposition based additive manufacturing system capable of producing a three-dimensional (3D) part, the method comprising:
   developing a first layer using at least one electrostatography engine, wherein the first layer comprises at least one of a part material and a support material;
   transfusing the first layer on a part build surface using a transfusion assembly to build the 3D part in a layer-by-layer manner on a part build platform, wherein a portion of the first layer further builds a fiducial structure in a layer-by-layer manner on the part build platform;
   measuring a height of the fiducial structure;
   computing an error between the measured height of the fiducial structure and a target height;
   adjusting a parameter of the at least one electrostatography engine as a function of the error;
   developing a second layer using the at least one electrostatography engine in accordance with the adjusted parameter; and
   transfusing the second layer using the transfusion assembly to further build the 3D part;
   wherein the step of measuring the height of the fiducial structure comprises:
   determining a stage height ($z_{stage}$) of the part build platform relative to a plane tangent to a nip roller of the transfusion assembly; and
   determining a cumulative layer height deviation ($z_{opt}$) of a top surface of the first layer at the fiducial structure relative to the plane tangent to the nip roller.

2. The method of claim 1, wherein the at least one electrostatography engine comprises an electrophotography engine, wherein the parameter that is adjusted is selected from the group consisting of voltage and luminescence.

3. The method of claim 1, wherein the parameter of the at least one electrostatography engine that is adjusted is an average for the entire first layer, by area.

4. The method of claim 1, wherein the step of determining the stage height ($z_{stage}$) comprises obtaining an encoder signal.

5. The method of claim 1, wherein the step of determining the cumulative layer height deviation ($z_{opt}$) comprises measuring a distance with a non-contacting range sensor.

6. The method of claim 5, wherein measuring the distance with the non-contacting range sensor comprises optically measuring the distance with a staring array of a plurality of individual sensing element fields of view.

7. The method of claim 1, wherein the step of measuring the height of the fiducial structure comprises calculating an average height of at least a portion of the fiducial structure based on a plurality of individual measurements.

8. The method of claim 7, wherein the average height of the at least a portion of the fiducial structure is averaged over an area of at least 10 mm$^2$.

9. The method of claim 1, wherein the fiducial structure comprises a first rail made of the part material and a second rail made of the support material, and wherein the first and second rails are transfused in a colinear arrangement substantially aligned with a direction of movement during transfusion of the first layer.

10. The method of claim 9, wherein the fiducial structure further comprises a third rail made of the part material and a fourth rail made of the support material, wherein the first, second, third and fourth rails are transfused in a colinear arrangement.

11. The method of claim 1, wherein the portion of the first layer used to build the fiducial structure is substantially the same height as a portion of the first layer used to build the 3D part.

12. The method of claim 1, wherein the fiducial structure is spaced from the 3D part on the part build platform.

13. The method of claim 1, wherein the at least one electrostatography engine comprises a plurality of electrostatography engines, wherein the plurality of electrostatography engines is used to build a predetermined number of layers of one or more materials.

14. The method of claim 13 and further comprising:
determining a contribution of each of the plurality of electrostatography engines from a combined signal representing the measured height of at least a portion of the predetermined number of layers built using the plurality of electrostatography engines.

15. The method of claim 1, wherein the at least one electrostatography engine comprises a plurality of electrostatography engines, and wherein at least two of the plurality of electrostatography engines are commonly controlled such that adjusting the parameter of the at least one electrostatography engine as a function of the error comprises adjusting a common parameter for the at least two of the plurality of electrostatography engines based on a common error signal.

16. The method of claim 1, wherein the fiducial structure is within the part being printed or a support structure for the part.

17. A method of operating a selective deposition based additive manufacturing system capable of producing a three-dimensional (3D) part, the method comprising:
developing a first layer using a plurality of electrostatography engines, wherein the first layer comprises both a part material and a support material;
transfusing the first layer on a part build surface using a transfusion assembly to build the 3D part in a layer-by-layer manner on a part build platform, wherein a portion of the first layer further builds a fiducial structure in a layer-by-layer manner on the part build platform, and wherein the fiducial structure comprises a rail substantially aligned with a direction of movement during transfusion of the first layer;
measuring a height of the fiducial structure over an area;
determining an average height of at least a portion of the fiducial structure over the area;
computing an error between the average height of the fiducial structure and a target height;
adjusting a parameter associated with at least one of the plurality of electrostatography engines as a function of the error; and
developing a second layer using the at least one of the plurality of electrostatography engines in accordance with the adjusted parameter
wherein the step of measuring the height of the fiducial structure comprises:
determining a stage height ($z_{stage}$) of the part build platform relative to a plane tangent to a nip roller of the transfusion assembly; and
determining a cumulative layer height deviation ($z_{opt}$) of a top surface of the first layer at the fiducial structure relative to the plane tangent to the nip roller.

18. The method of claim 17, wherein the step of measuring the height of the fiducial structure comprises:
determining a stage height ($z_{stage}$) of the part build platform relative to a plane tangent to a nip roller of the transfusion assembly and substantially parallel to the direction of movement during transfusion of the first layer;
determining a cumulative layer height deviation ($z_{opt}$) of a top surface of the first layer at the fiducial structure relative to the plane tangent to the nip roller with a non-contacting range sensor; and
combining the stage height ($z_{stage}$) and the cumulative layer height deviation ($z_{opt}$).

19. The method of claim 17, wherein the fiducial structure comprises a first rail made of the part material and a second rail made of the support material, and wherein the first and second rails are transfused in a colinear arrangement.

* * * * *